(12) United States Patent
Little et al.

(10) Patent No.: US 8,157,596 B1
(45) Date of Patent: Apr. 17, 2012

(54) COMPACT MULTI-FUNCTION CARD CONNECTOR

(75) Inventors: Terrance F. Little, York, PA (US); Richard Scott Kline, Mechanicsburg, PA (US); Kuo-Chun Hsu, New Taipei (TW); Hsueh-Lung Hsiao, New Taipei (TW); Hung-Yang Yeh, New Taipei (TW); Tod M. Harlan, Mechanicsburg, PA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 13/006,413

(22) Filed: Jan. 13, 2011

(51) Int. Cl.
*H01R 24/00* (2011.01)
(52) U.S. Cl. .......................... 439/630; 439/386; 439/217
(58) Field of Classification Search ................. 439/386, 439/629, 630
See application file for complete search history.

(56) References Cited

U.S. PATENT DOCUMENTS

| | | | | |
|---|---|---|---|---|
| 7,204,717 B2 * | 4/2007 | Chang et al. | ................. | 439/630 |
| 7,234,969 B2 * | 6/2007 | Chang et al. | ................. | 439/630 |
| 7,455,555 B1 * | 11/2008 | Lai | ................. | 439/630 |
| 7,465,197 B1 * | 12/2008 | Wu et al. | ................. | 439/630 |
| 8,016,618 B2 * | 9/2011 | Takai et al. | ................. | 439/630 |
| 2004/0113249 A1 * | 6/2004 | Ito et al. | ................. | 257/679 |
| 2006/0116027 A1 * | 6/2006 | Tseng et al. | ................. | 439/630 |
| 2006/0223376 A1 * | 10/2006 | Chang et al. | ................. | 439/630 |
| 2011/0008982 A1 * | 1/2011 | Tung et al. | ................. | 439/152 |

FOREIGN PATENT DOCUMENTS

CN 200610093206 7/2009

\* cited by examiner

*Primary Examiner* — James Harvey
(74) *Attorney, Agent, or Firm* — Wei Te Chung; Andrew C. Cheng; Ming Chieh Chang

(57) ABSTRACT

A card connector (100) includes an insulating housing (1) defining a card receiving space; a set of first contacts (21) supported by the insulative housing and adapted for mating with XD card, and the first contacts having at least one grounding contact (211G); a set of second contacts (22) supported by the insulative housing and adapted for mating with SD card, the second contacts having at least one grounding contact (221G); a set of third contacts (23) supported by the insulative housing and adapted for mating with MS card, the third contacts having at least one grounding contact (231G); and at least two of the grounding contacts commonly grounded.

18 Claims, 16 Drawing Sheets

COMPACT MULTI-FUNCTION CARD CONNECTOR

BACKGROUND OF THE INVENTION

1. Field of the Invention

The present invention relates to a card connector, especially to a compact multi-function card connector.

2. Description of Related Art

With development of consuming products, such as portable telephones, digital cameras, PDA (Personal Digital Assistance), portable audio and the like, a lot of different kinds of cards, such as a SD (Super Density, Secure Digital) card, a MMC (Multi-Media Card), a SM (Smart Media) card, a MS (Memory Stick) card and a XD (XD-picture) card, are widely used in the field of the consuming products. Therefore, different card connectors are needed to load different cards. However, one card connector only loads one corresponding card, the above consuming product needs to be designed with different card connectors which occupy too much space and increase cost of the consuming product. Thus, a card connector which can load some different cards is required.

At present, a card connector which can load different cards has a plurality of inserting cavities for receiving different cards. In such situation, we must face to another problem that different type of contacts for mating with different cards takes up more space, and a profile of the card connector increases, especially a total width of tail portions of the card connector expanded, which may needs more soldering area of a printed circuit board onto which the card connector is mounted.

Some methods is adopted to solve aforementioned problem, for example, CN patent No. 200610093206 issued on Jul. 8, 2009 discloses a card connector for mating with different kinds of cards. Tail portions of the patent are separated into two sets and respectively arranged at a front side and a back side of the card connector. However, it is difficult to control the two sets of tail portions co-planarity, as a plastic housing of the card connector may undergo stress from warpage or twisting during the I.R. reflow process. Another method of decreasing width of tail portions of card connector is to divide tail portions into several sets along a front-to-back direction, but may have difficulty in soldering process.

Hence, an improved card connector is required to overcome the problems of the prior art.

SUMMARY OF THE INVENTION

An object of the present invention is to provide a compact card connector which is adapted for different kinds of cards.

Accordingly, to achieve above-mentioned object, a card connector comprises an insulating housing defining a card receiving space; a set of first contacts supported by the insulative housing and adapted for mating with XD card, and the first contacts having at least one grounding contact; a set of second contacts supported by the insulative housing and adapted for mating with SD card, the second contacts having at least one grounding contact; a set of third contacts supported by the insulative housing and adapted for mating with MS card, the third contacts having at least one grounding contact; and at least two of the grounding contacts commonly grounded.

The detailed features of the present invention will be apparent in the detailed description with appropriate reference to the accompanying drawings.

DETAILED DESCRIPTION OF THE INVENTION

Reference will now be made in detail to the preferred embodiment of the present invention.

Figure 1:
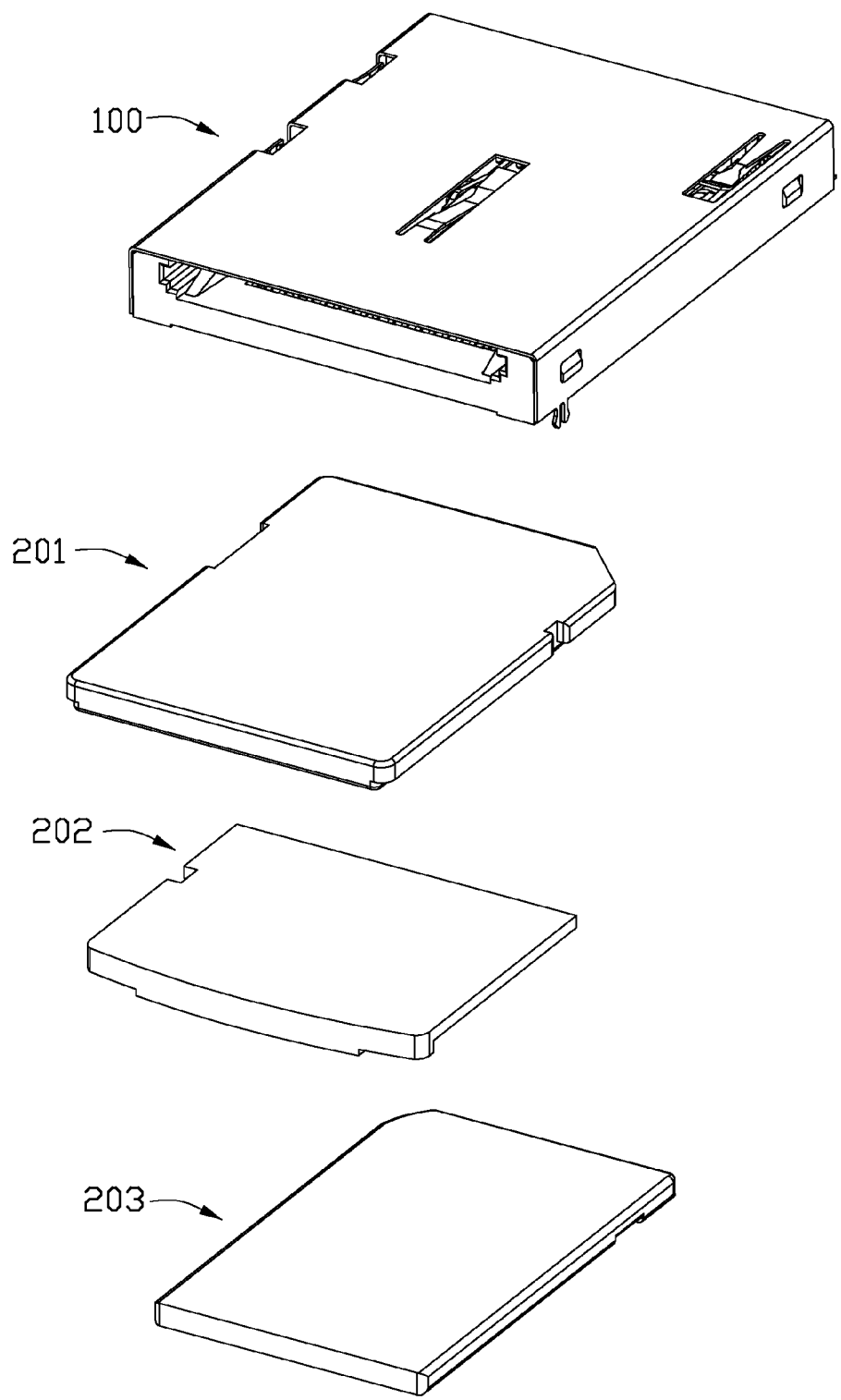
FIG. 1 is an assembled, perspective view of a card connector capable of mating different kinds of cards in accordance with the present invention.
Figure 2:
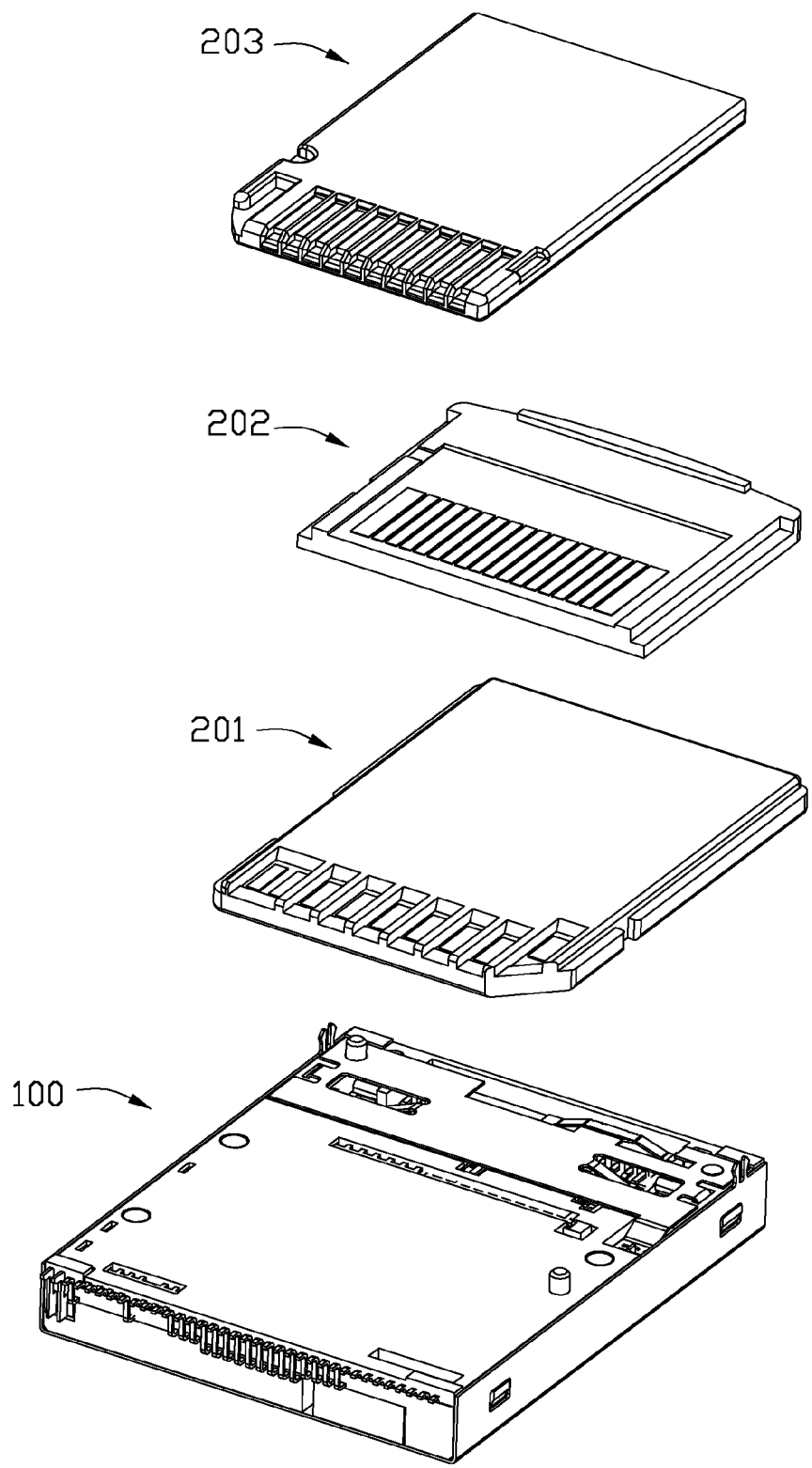
FIG. 2 is a view similar to FIG. 1, but viewed from other aspect.
Figure 3:
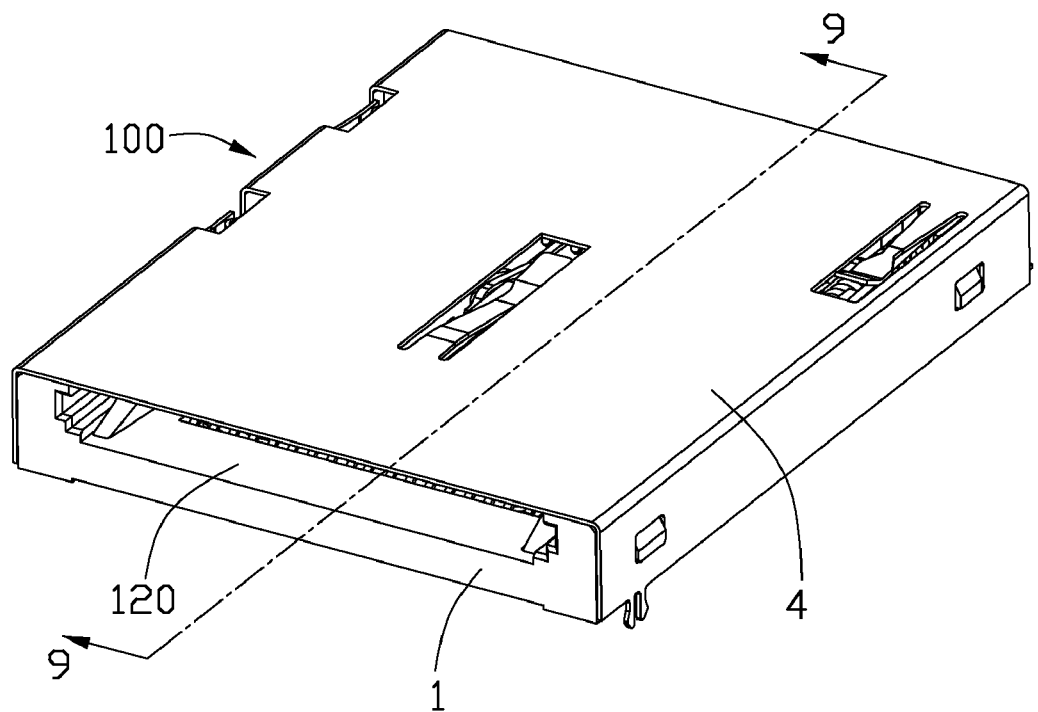
FIG. 3 is an assembled, perspective view of the card connector.
Figure 4:
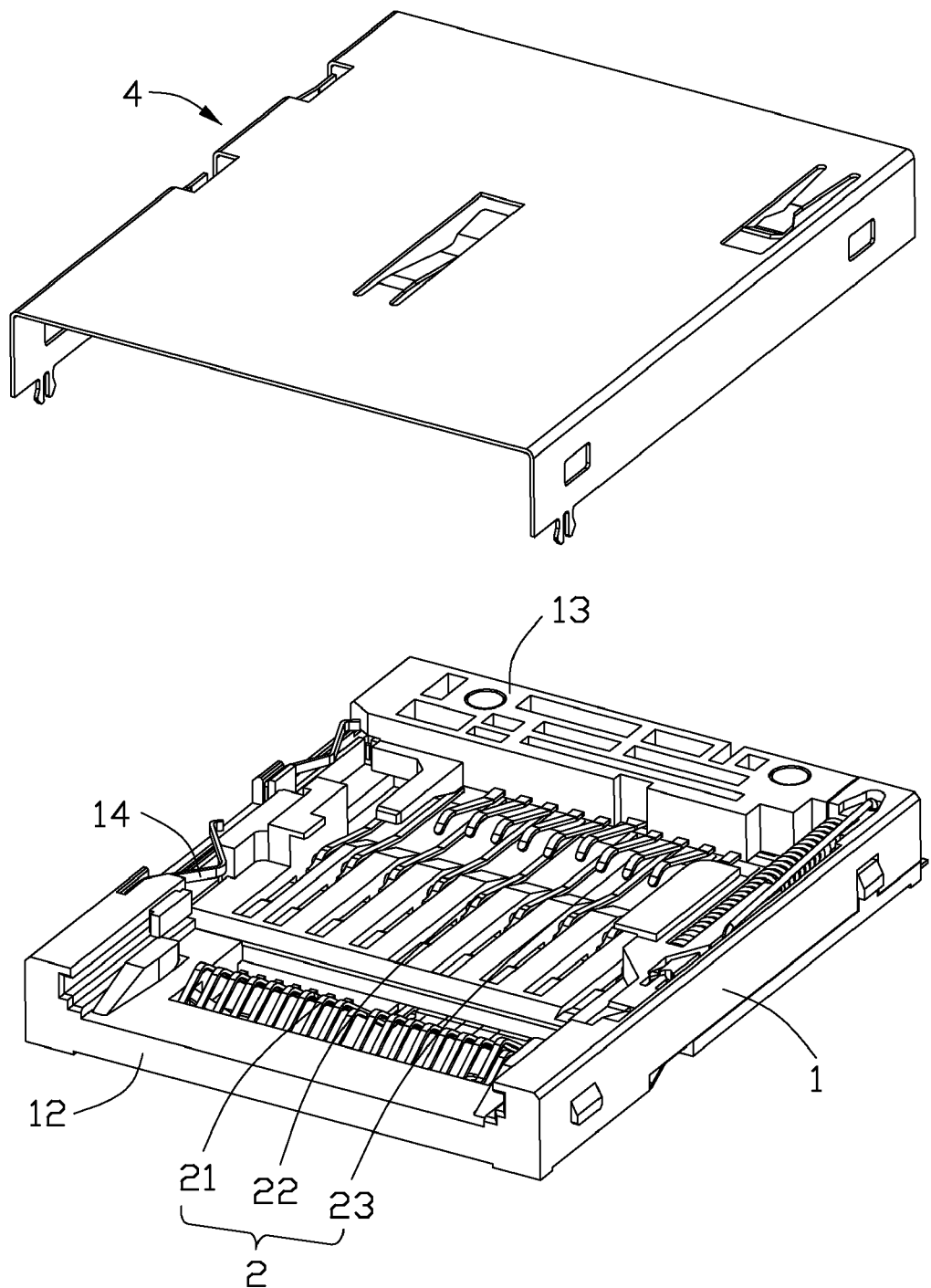
FIG. 4 is a partially exploded perspective view of the card connector shown in FIG. 3.
Figure 5:
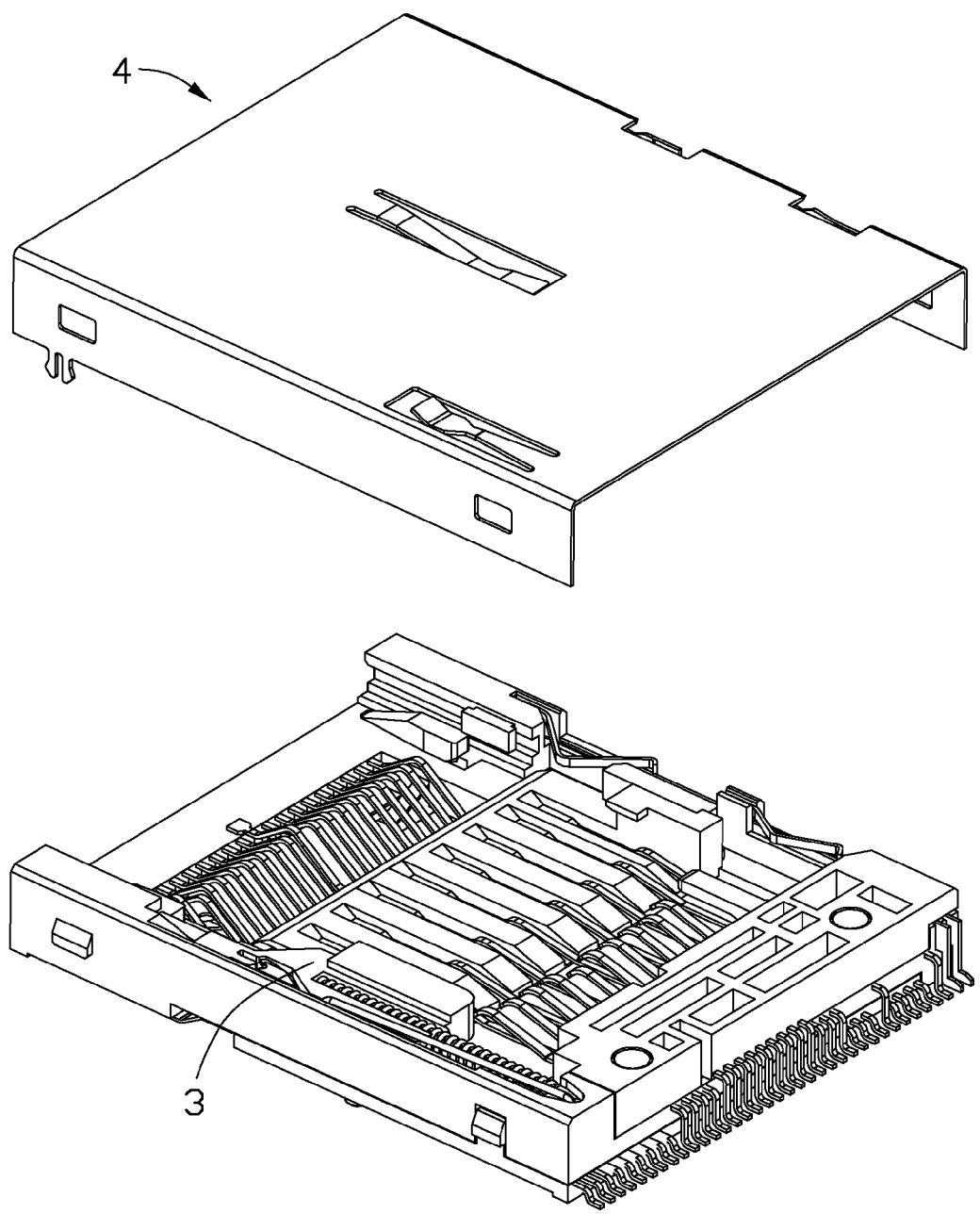
FIG. 5 is a view similar to FIG. 4, but viewed from other direction.
Figure 6:
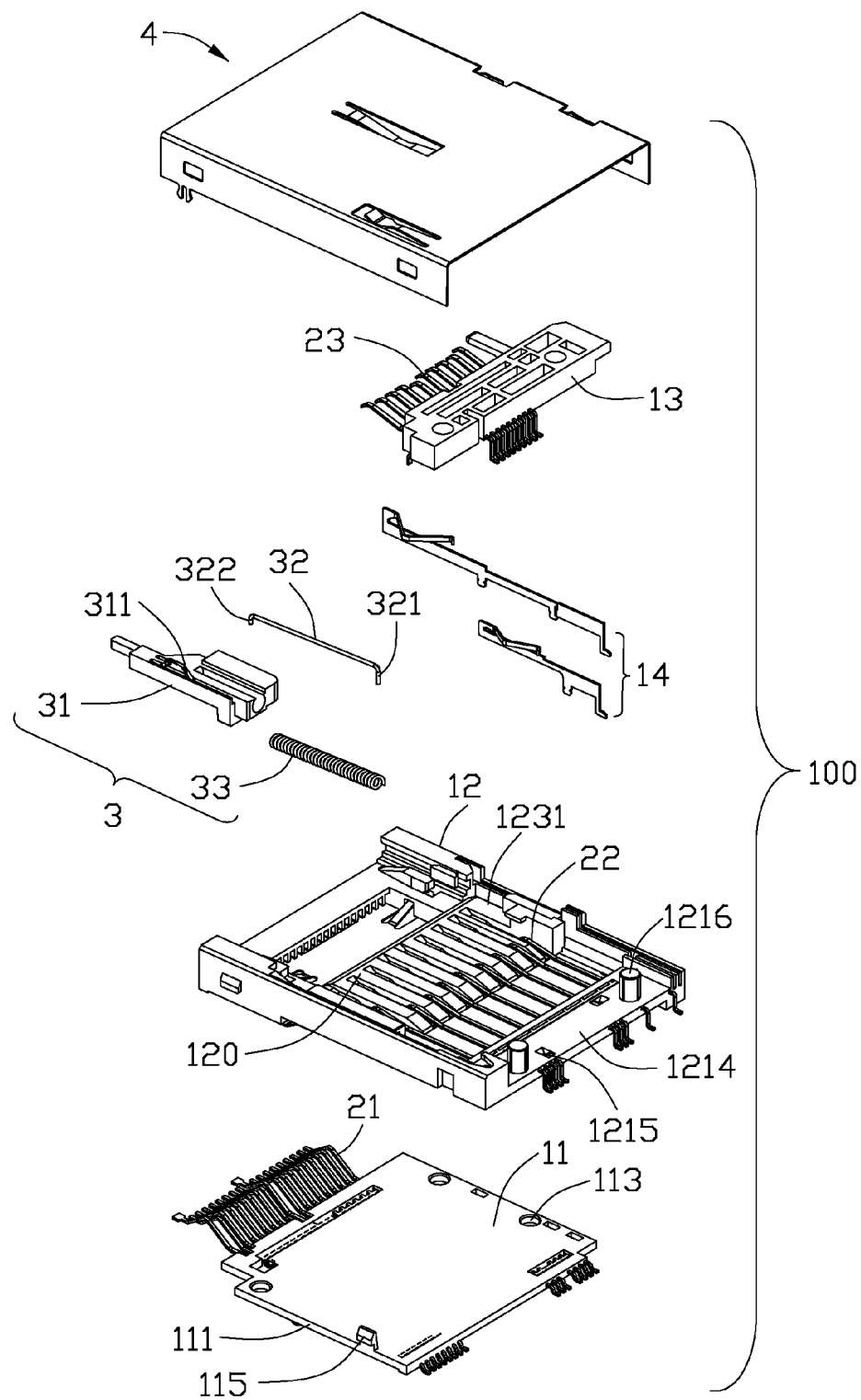
FIG. 6 is other partially assembled, perspective view of the card connector shown in FIG. 3.
Figure 7:
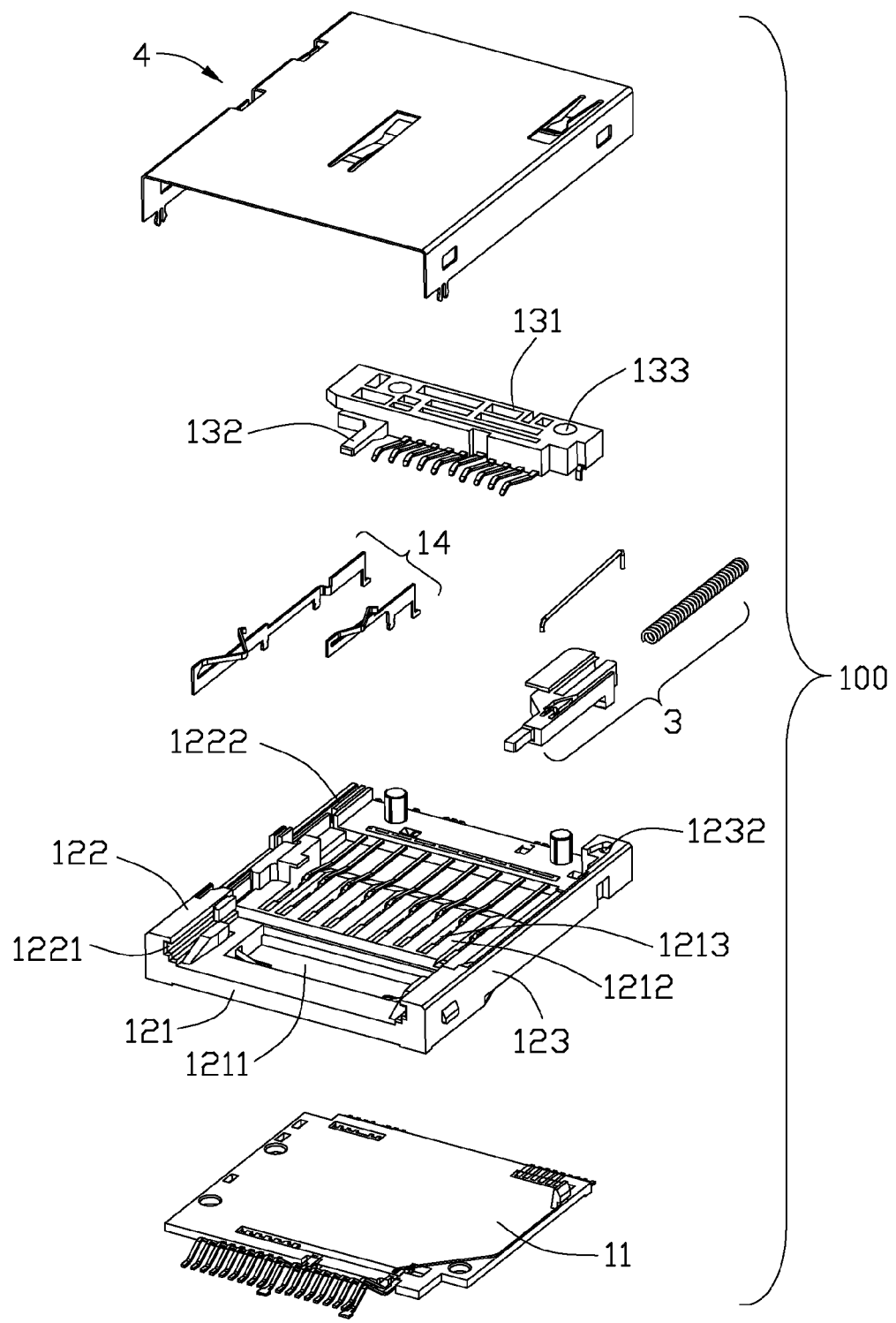
FIG. 7 is a view similar to FIG. 6, but viewed from other direction.
Figure 8:
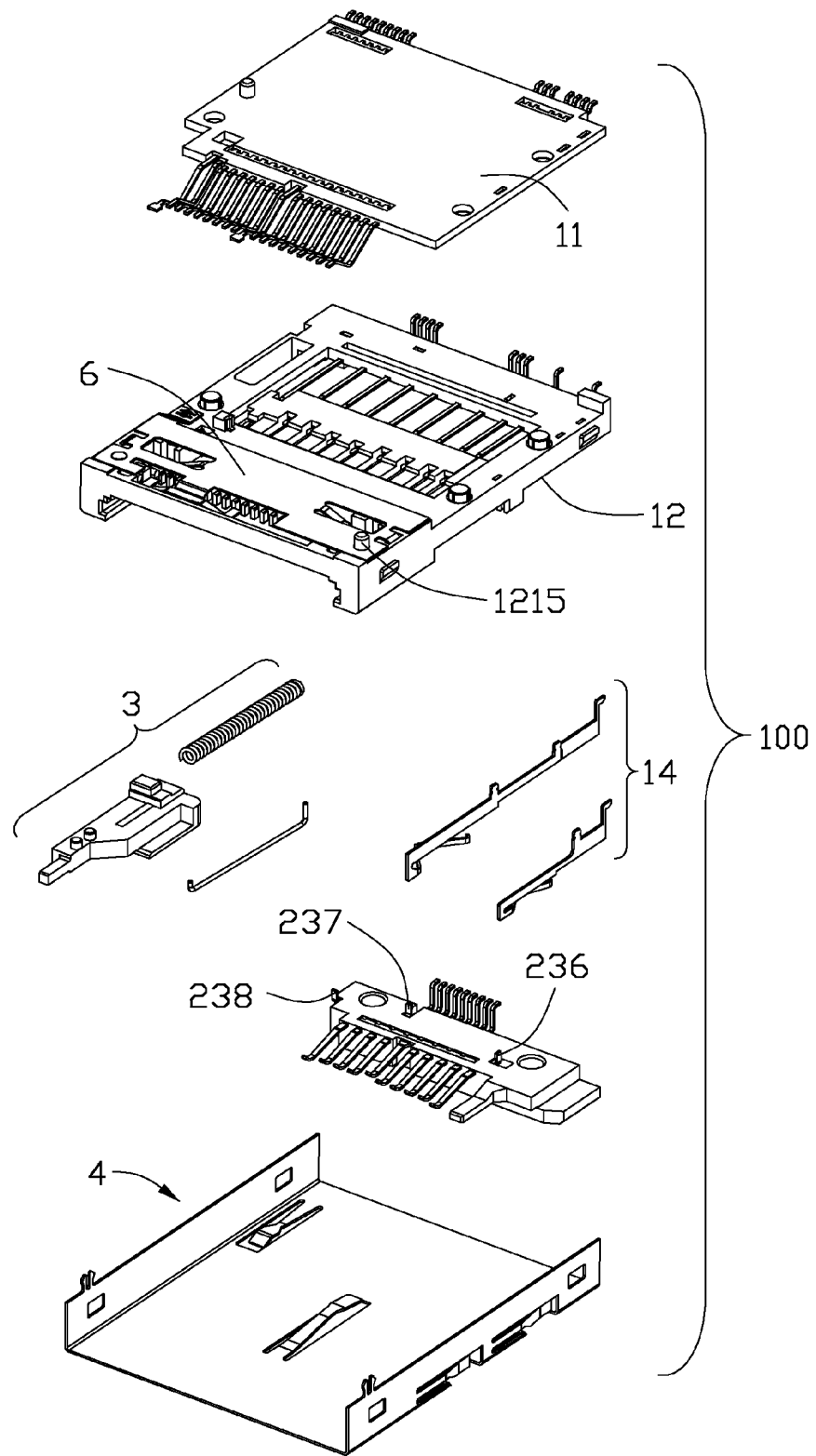
FIG. 8 is a view similar to FIG. 6, but viewed from another direction.
Figure 9:
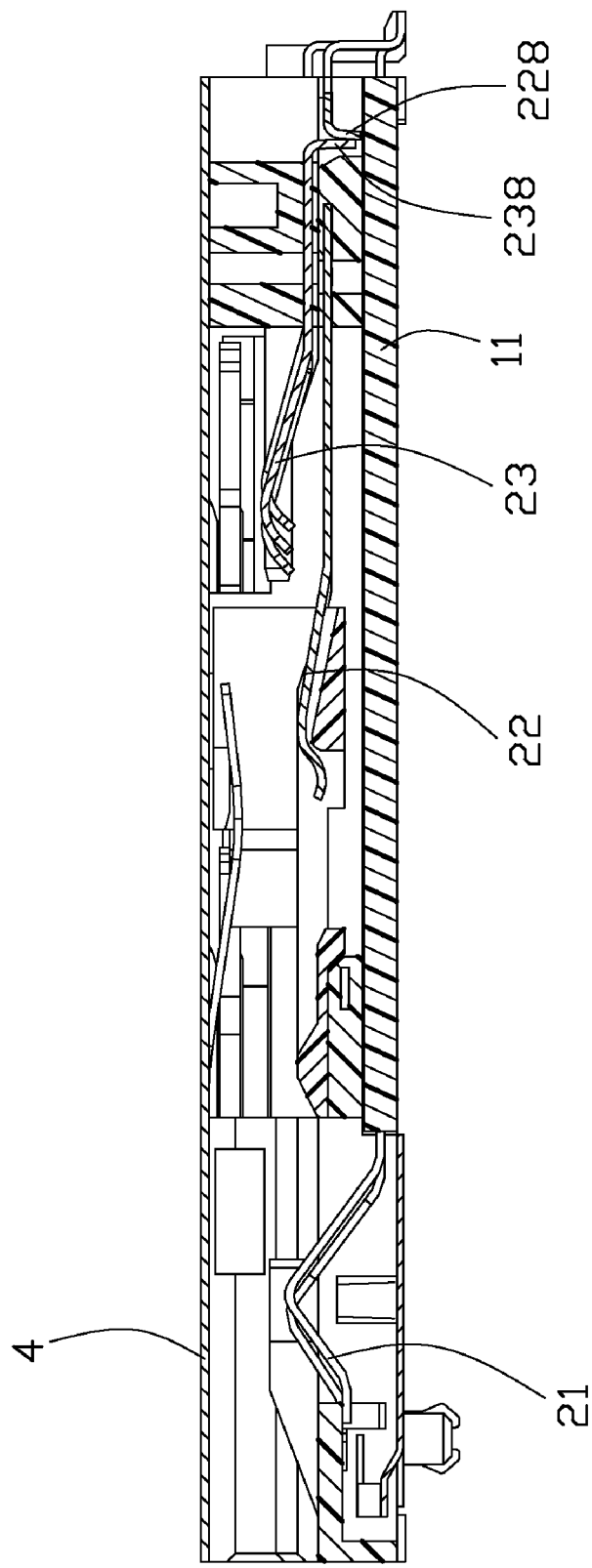
FIG. 9 is a cross-sectional view of the card connector taken along line 9-9.
Figure 10:
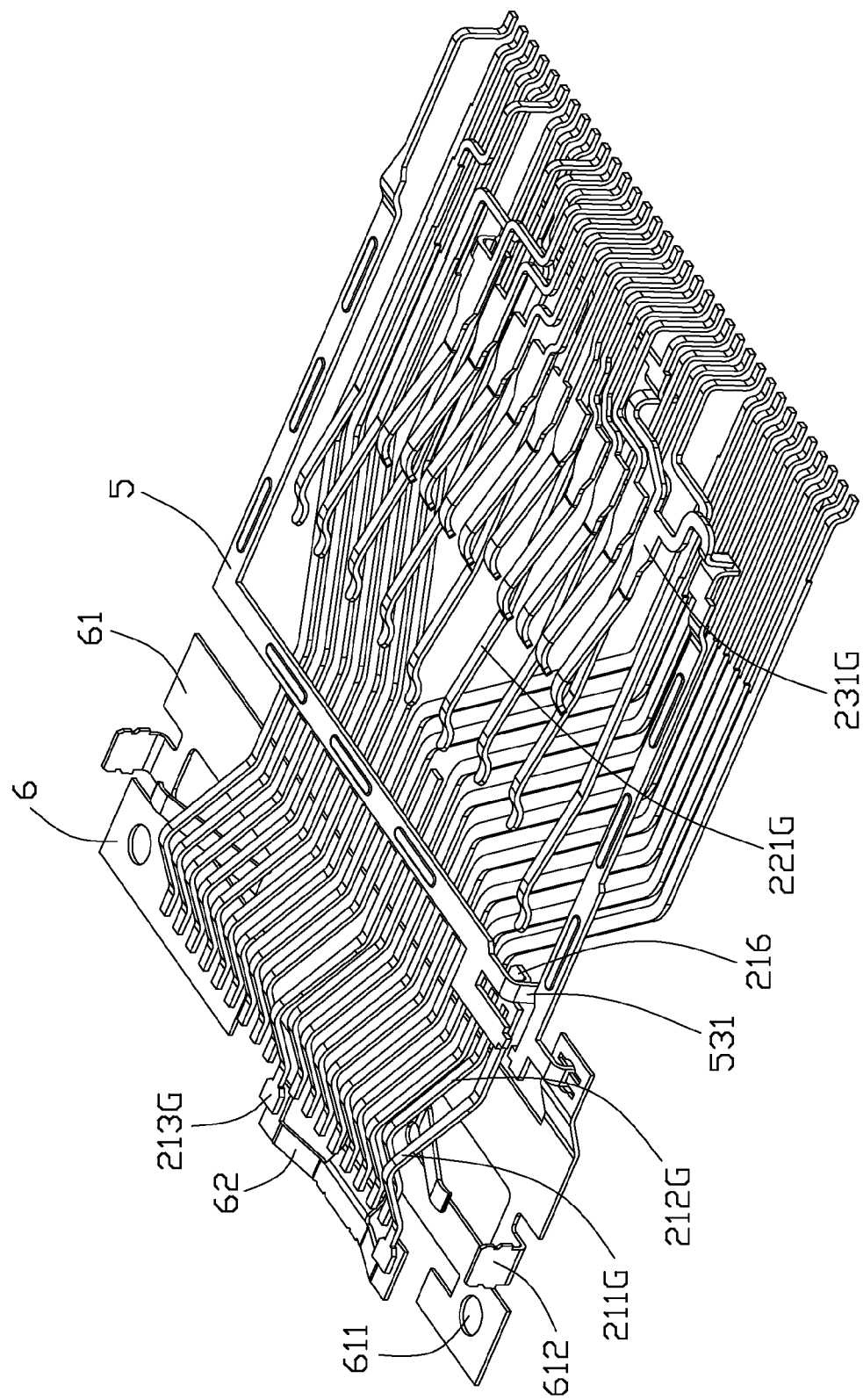
FIG. 10 shows relations between different contacts and grounding elements.
Figure 11:
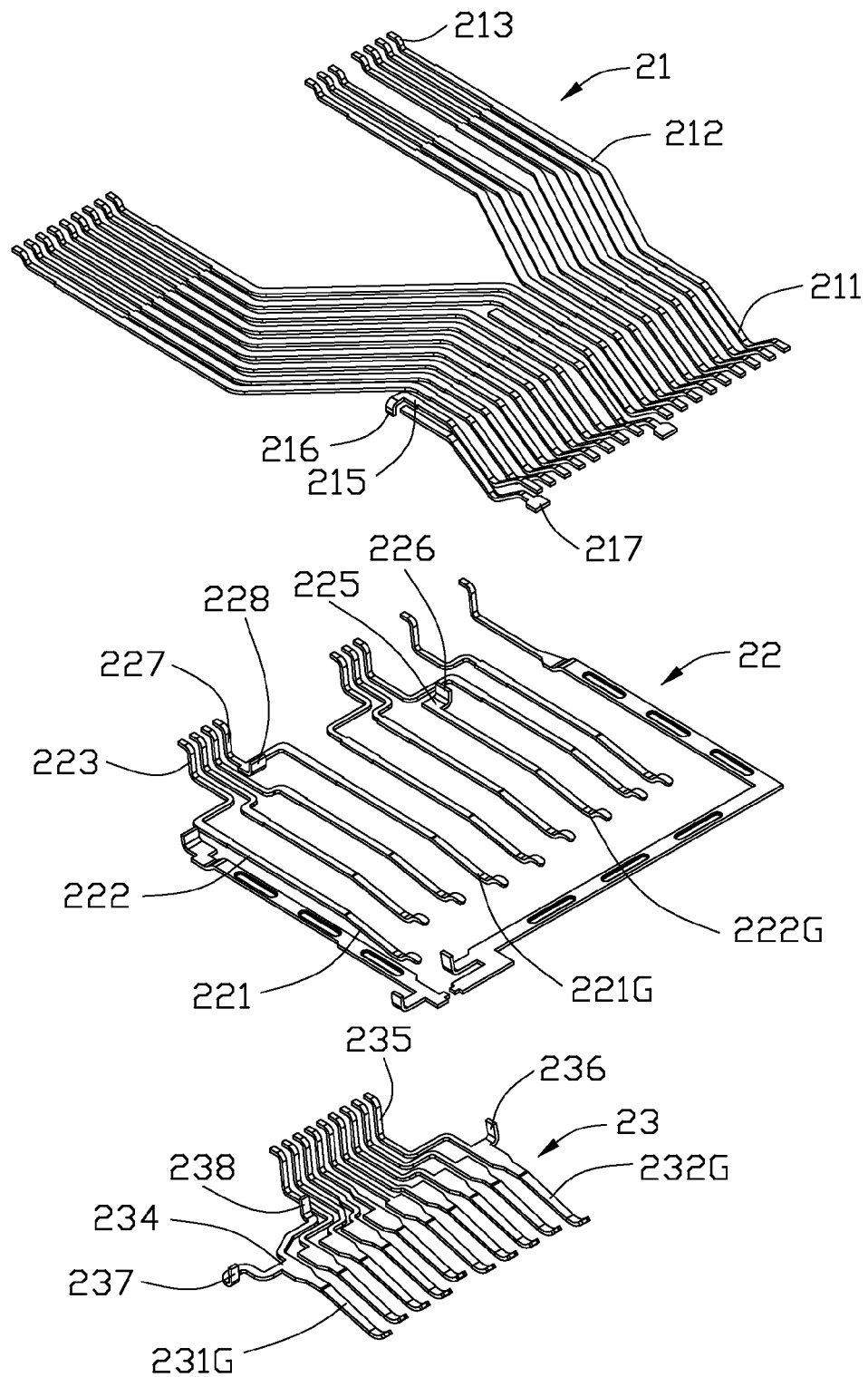
FIG. 11 shows the contacts divided into a set of first contacts, a set of second contacts and a set of third contacts.
Figure 12:
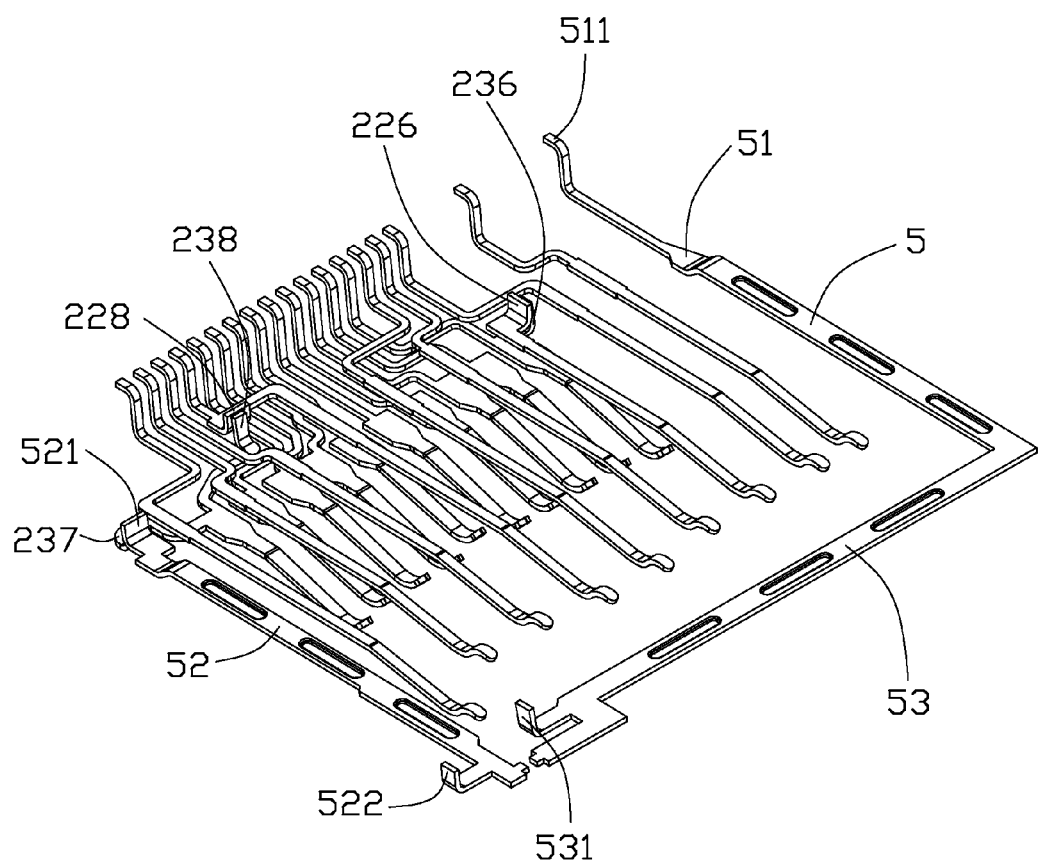
FIG. 12 shows relations between the set of second contacts, the set of second contacts.
Figure 13:
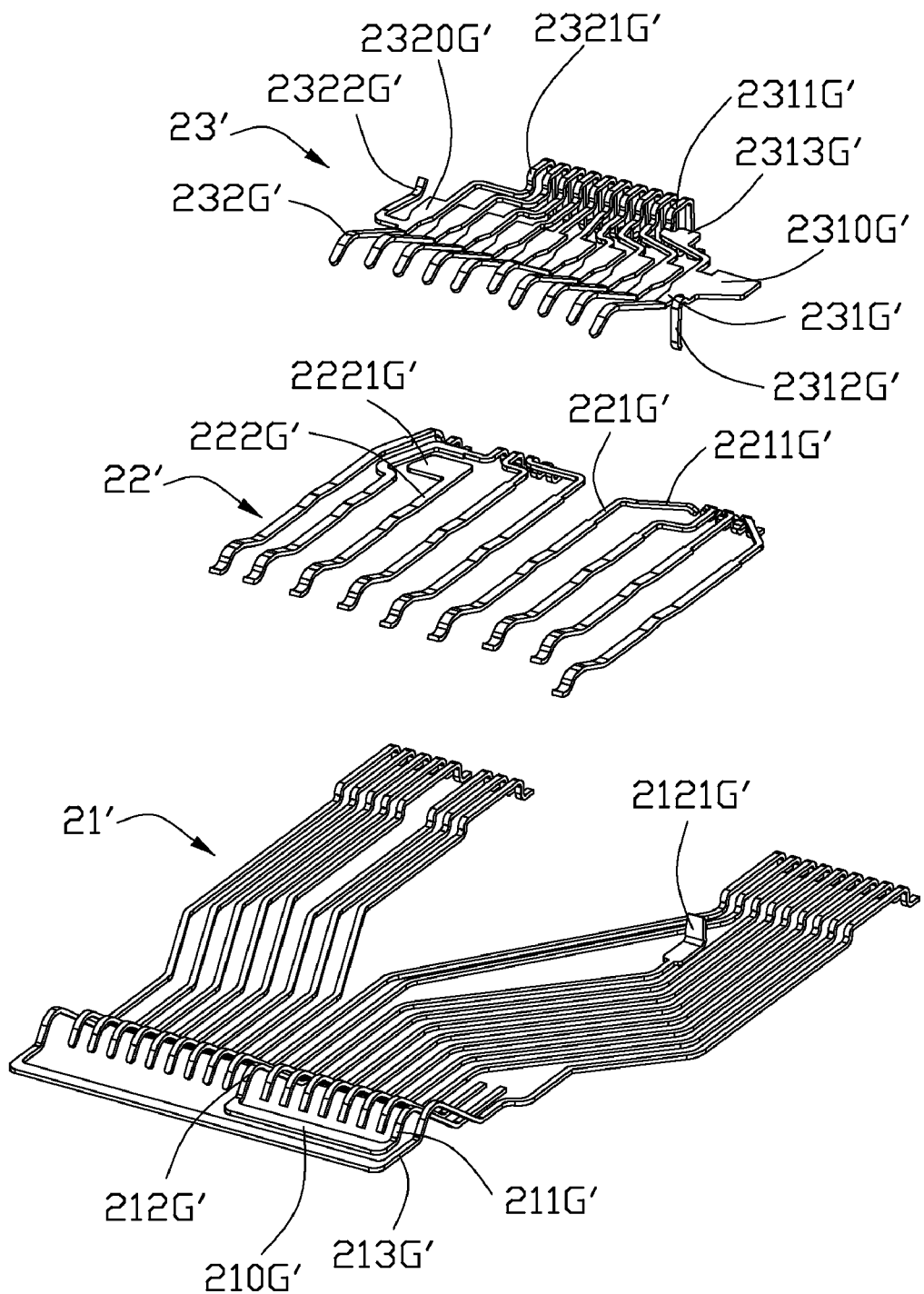
FIG. 13 shows contacts divided into three groups in an alternative embodiment.
Figure 14:
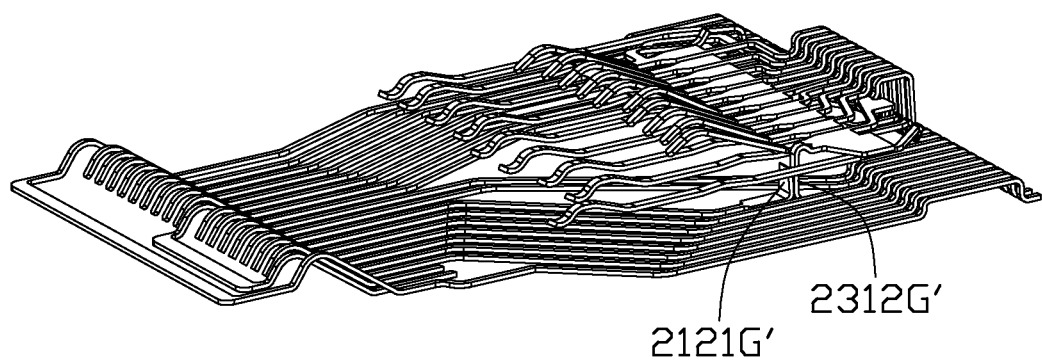
FIG. 14 shows relations between contacts of different groups.
Figure 15:
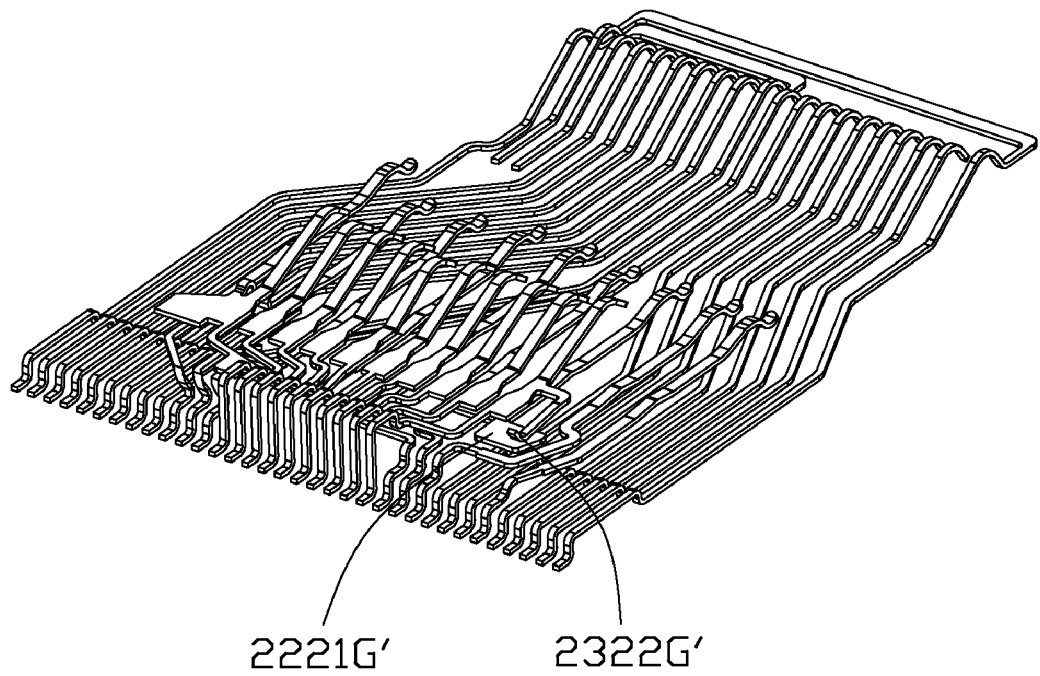
FIG. 15 is a view similar to FIG. 14, but viewed from other direction.
Figure 16:
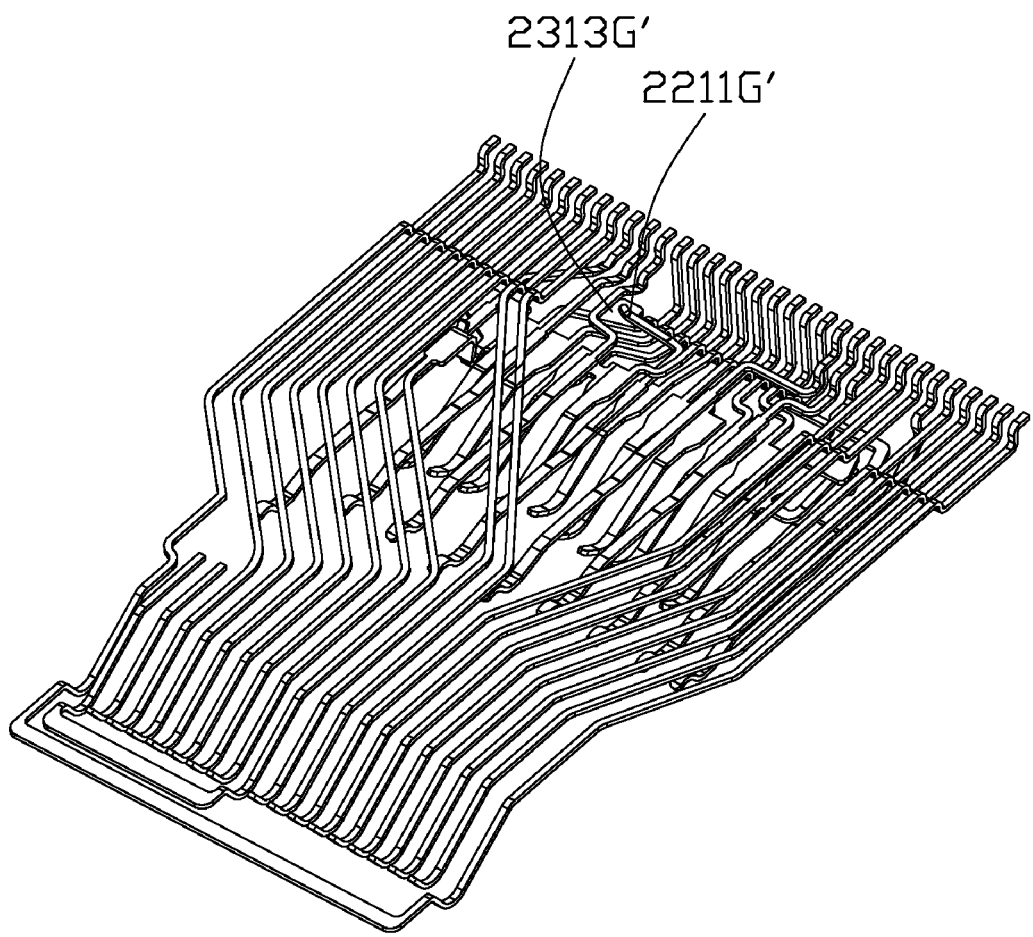
FIG. 16 is a view similar to FIG. 14, but viewed from another direction.

Referring to FIGS. 1-2, a card connector 100 in accordance with the present invention is adapted for insertion of different kinds of cards 201-203. The cards 201-203 refer to SD card, XD card and MS card, respectively.

Referring to FIGS. 3-12, the card connector 100 comprises an insulative housing 1, a plurality of contacts 2 supported by the insulative housing 1, an ejecting mechanism 3 mounted to lateral side of the insulative housing 1 and a metallic cover 4 shielding the insulative housing 1 and the ejecting mechanism 3 mounted to the insulative housing 1. The card connector 100 further comprises a grounding bus bar 5 and a grounding plate 6 assembled to the insulative housing 1.

The insulative housing 1 includes a first housing piece 11, a second housing piece 12 and a third housing piece 13 assembled together along a up-to-down direction. The contacts 2 are divided into a set of first contacts 21, a set of second contacts 22 and a set of third contacts 23. The first contacts 21 are combined with the first housing piece 11 by insert-molding process or other manufacturing process to form a first contact module. The second contacts 22 are combined with the second housing piece 12 by insert-molding process or other manufacturing process to form a second contact module. The third contacts 23 are combined with the third housing piece 13 by insert-molding process or other manufacturing process to form a third contact module.

The first insulative housing 11 includes a board member 111, a number of positioning holes 113 defined at lateral sides of the board member 111 and a hook 115 projecting upward from one of the lateral sides of the board member 111. The set of first contacts 21 are adapted for mating with XD card. There are nineteen first contacts in the set of first contacts 21 arranged in a row along a transversal direction. Three first contacts 21 are respectively located at the first position, the second position and the tenth position referring to a first grounding contact 211G, i.e. XD Pin #1, a second grounding contact 212G, i.e. XD Pin #19 and a third grounding contact 213G, i.e. XD Pin #9. The second grounding contact 212G has a L-shaped tail portion 215 and the tail portion 215 further has a free end 216 projecting upwardly. The first grounding contact 211G and the third grounding contact 213G have an expanded free end extending beyond other first contacts. And the remaining sixteen first contacts are used for transmitting signal or power, and each of them has a mating portion 211, a tail portion 213 and a retention portion 212 connecting the mating portion 211 and the tail portion 213. The three grounding contacts are much shorter than the other sixteenth first contacts, without any tail portions extending beyond a back side of the first insulative housing 11, therefore there are only sixteen tail portions 213 arranged in a row and disposed at a same plane backward the first insulative housing 11.

The second insulative housing 12 includes base portion 121 and a left wall 122 and a right wall 123 respectively formed at lateral sides and protruding upwardly. The base portion 121 and the left wall 122 and right wall 123 together form a card receiving space 120. A rectangular shaped cavity 1211 is defined through a front segment of the base portion 121. A platform 1212 is located at a middle segment of the base portion 121 and there are plurality of contact grooves 1213 defined in the platform 1212. Two posts 1216 are formed on lateral sides of a back portion 1214 of the base portion 121, and there are two holes 1215 defined in the back portion 1214. The left wall 122 defines two corresponding contacting passages 1222 to accommodate two corresponding detecting contacts 14 therein. The right wall 123 defines a slot 1231 in middle segment thereof and extending along a front-to-back direction. A positioning hole 1232 is defined at rear portion of the right wall 123. The set of second contacts 22 are adapted for mating with SD card. There are nine second contacts in the set of second contacts 22 arranged in a row along a transversal direction. There are two second contacts 22 respectively located at the fourth position and the seventh position referring to a first grounding contact 221G, i.e. SD Pin #6 and a second grounding contact 222G, i.e. SD Pin #3. The second grounding contact 222G has a L-shaped tail portion 225 and the tail portion 225 further has a free end 226 projecting downwardly. The first grounding contact 221G has a L-shaped tail portion 227 and a reversed L-shaped tail branch 228 connected to the tail portion 227. The tail branch 228 is located in front of and adjacent of the tail portion 227. And the remaining seven second contacts are used for transmitting signal or power, and each of them has a mating portion 221, a tail portion 223 and a retention portion 222 connecting the mating portion and the tail portion 213. The second grounding contact 222G is much shorter than the other nine second contacts, without any tail portion extending beyond a back side of the second insulative housing 12. In addition, the free end 226 and the tail branch 228 extend into two holes 1215 of the second insulative housing 12.

The third insulative housing 13 includes a main portion 131, a key member 132 projecting forwardly from the main portion 131. Two mounting holes 133 defined at lateral segments of the main portion 131. The set of third contacts 23 are adapted for mating with MS card. There are ten third contacts in the set of third contacts 23 arranged in a row along a transversal direction. There are two third contacts 23 respectively located at the first position and the tenth position referring to a first grounding contact 231G, i.e. MS Pin #10 and a second grounding contact 232G, i.e. MS Pin #1. The second grounding contact 232 has a L-shaped tail portion 235 and a reversed L-shaped tail branch 236 connected to a middle part of the first grounding contact MS1. The first grounding contact 231G has a Y-shaped tail portion 234, and the Y-shaped tail portion 234 has two reversed L-shaped free ends 237, 238. The first grounding contact 231G is much shorter than the other nine second contacts, without any tail portion extending beyond a back side of the third insulative housing 13. In addition, the free ends 237, 238 and the tail branch 236 disposed under the third insulative housing 13.

The ejecting mechanism 3 includes a slider 31, a follower 32 and a spring 33. The slider 31 is mounted to the slot 1231 and capable of sliding therein along the front-to-back direction. The spring 33 biases the slider 31 forwardly. The follower 32 has a rear hook 321 locking into the positioning hole 1232 and a front hook 322 capable moving in a heart-shaped slot 311 defined in the slider 31.

The grounding bus bar 5 includes a first arm 51, a second arm 52, and a third arm 53 connected with each other to form a frame. The first arm 51 and the second arm 52 are substantially parallel to one another. The first arm 51 and second arm 52 both are perpendicular to the third arm 53. The first arm 51 has a L-shaped tail part 511 which is disposed at a same plane with the tail portions 223. The second arm 52 has a first reversed L-shaped extending part 521 formed at a back end thereof and a second reversed L-shaped extending part 522 laterally projecting from a front end thereof. The third arm 53 has a third reversed L-shaped extending part 531 formed at a lateral end thereof and disposed adjacent to the second reversed L-shaped extending part 522.

The grounding plate 6 has a rectangular main portion 61 and a raised strip 62 connected to the main portion 61 and further located in front of the main portion 61. There are two through holes 611 defined in two opposite front corners of the main portion 61 and two mounting ears 612 located behind the two through holes 611 and protruding upwardly.

When assemble, the first contact module is mounted to a lower side of the second contact module, with the mating portions 211 of the first contacts 21 extending into the card receiving space 120 from the cavity 1211; the third terminal module is mounted to an upper side of the second contact module, with the main portion 131 of the third insulative housing 13 mounted on the back portion 1214 of the base portion 121, and the tail branch 236 and the free ends 237, 238 inserted into the holes 1215 in the back portion 1214, with the free ends 237 of the tenth grounding contact MS10 compressing/pressing the extending part 521 of the second arm 52, the free ends 238 of the first grounding contact 231G compressing/pressing the tail branch 228 of the first grounding contact 221G, the tail branch 236 of the second grounding contact 232G compressing/pressing the free end 226 of the second grounding contact 222G. The free end 216 of the second grounding contact 212G compressing/pressing the extending part 531 of the third arm 53. The grounding plate 6 is mounted to lower side of the base portion 121 and disposed under the cavity 1211, and front ends of the first grounding contact 211G and the third grounding contact 213G pressing onto/contacting the strip 62. The two mounting ears 612 are inserted into the base portion 121. By such arrangement, the first grounding contact 211G and third grounding contact 213G electrically connected to each other via the grounding plate 6 to achieve common grounding, further electrically connected to the first grounding contact 231 via the second arm 52 of the grounding bus bar 5 which also contacts the first grounding contact 221G, therefore, a common grounding path is formed.

Referring to FIGS. 13-16 in conjunction with FIGS. 1-12, which shows a simplified contact groups of an alternative embodiment. Compared with aforementioned embodiment, there are no grounding bus bar and grounding plate as assistant means for grounding. Detailed description of the contacts arrangement of the alternative embodiment as below, and other similar elements and their relations between the two embodiment is omitted hereby.

The alternative embodiment includes a set of first contacts 21', a set of second contacts 22' and a set of third contacts 23' with same function as the set of first, second and third contacts 21-23 of the aforementioned embodiment. The first contacts 21' includes a first grounding contact 211G' and a second grounding contact 212G' electrically and mechanically connected with each other by a transversal bar 210G' unitarily with front ends thereof. The second grounding contact 212G' has a L-shaped tail portion 2121G' projecting upwardly. The first contacts 21' further includes a third grounding contact 213G' as a single piece and extending backwardly to form an independent grounding path without any other auxiliary elements, such as a grounding bar. The second contacts 22' includes a first grounding contact 221G' and a second grounding contact 222G'. The first grounding contact 221G' has tail portion 2211G' first backwardly and laterally extending, then downwardly extending. The second grounding contact 222G' has a broader tail portion 2221G'. The third contacts 23' includes a first grounding contact 231G' and a second grounding contact 232G'. The first grounding contact 231G' has a planar body portion 2310G' with a finger 2312G' extending downwardly from a front edge of the body portion 2310G' and a tail portion 2311G' connecting with a back edge of the body portion 2310G', and the tail portion 2311G' has an expanded portion 2313G' located at a horizontal level. The finger 2312G' contacts with the tail portion 2121G'. The tail portion 2211G' contacts with the expanded portion 2313G'. The second grounding contact 232G' has a body portion 2320G' with a L-shaped tab 2322G' disposed at left side thereof and a tail portion 2321G' extending backwardly from the body portion 2320G'. The tab 2322G' contacts with the tail portion 2221G'.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector, comprising:
   an insulating housing defining a card receiving space;
   a set of first contacts supported by the insulative housing and adapted for mating with a first type card, and the first contacts having at least one grounding contact;
   a set of second contacts supported by the insulative housing and adapted for mating with a second type card, the second contacts having at least one grounding contact;
   a set of third contacts supported by the insulative housing and adapted for mating with at third type card, the third contacts having at least one grounding contact; and
   at least two of the grounding contacts are commonly grounded;
   wherein the grounding contact of the second contacts and the grounding contact of the third contacts are compressing or pressing with each other and electrically connected with each other.

2. The card connector as claimed in claim 1, wherein three of the grounding contacts are commonly grounded.

3. A card connector comprising:
   an insulative housing defining a card receiving space;
   a plurality of first contacts disposed in the housing with resilient first contacting sections extending into the card receiving space, and first tail sections extending outside of the housing;
   a plurality of second contacts disposed in the housing with resilient second contacting sections extending into the card receiving space, and second tail sections extending outside of the housing;
   the first contacting sections and the second contacting sections being arranged with essentially two rows along a transverse direction, respectively, under condition that said two rows are spaced from each other in a front-to-back direction perpendicular to said transverse direction;
   the first contacts including two first grounding contacts spaced from each other in said transverse direction with at least another first contact therebetween; and
   a grounding bus extending in the transverse direction in front of the first contacting sections of the first contacts to commonly ground front ends of grounding contacting sections of said two first grounding contacts; wherein
   contacting points of the first contacting sections of said two first grounding contacts are located slightly in front of those of the first contacting sections of the remaining first contacts in said front-to-back direction.

4. The card connector as claimed in claim 1, wherein the second contacts has a first grounding contact, and the third contacts has a first grounding contact electrically connected to the first grounding contact of the second contacts.

5. The card connector as claimed in claim 4, wherein the first contacts has a first grounding contact electrically connected to the first grounding contact of the third contacts via a grounding bus bar.

6. The card connector as claimed in claim 1, wherein the second contacts has a second grounding contact, and the third contacts has a second grounding contact electrically connected to the second grounding contact of the second contacts.

7. The card connector as claimed in claim 1, wherein the first contacts have two grounding contacts commonly grounded via a grounding plate or via transversal bar unitarily with them.

8. The card connector as claimed in claim 7, wherein the first contacts further has other grounding contact electrically connected to a grounding bus bar which further extends beyond a back side of the insulative housing.

9. A card connector comprising:
   an insulative housing defining a card receiving space therein;
   a plurality of first contacts disposed in the housing with resilient first contacting sections extending into the card receiving space, and first tail sections extending outside of the housing;
   a plurality of second contacts disposed in the housing with resilient second contacting sections extending into the card receiving space, and second tail sections extending outside of the housing;
   the first contacting sections and the second contacting sections being arranged with two rows along a transverse direction, respectively, under condition that said two rows are spaced from each other in a front-to-back direction perpendicular to said transverse direction, while the first tail sections and the second tail sections being arranged in a single row along said transverse direction;
   the first contacts including one first grounding contact, the second contacts including one second grounding contact commonly grounding to each other;

wherein the first grounding contact indirectly contacts the second grounding contact via a grounding bar.

10. The card connector as claimed in claim 3, wherein said grounding bus is unitarily formed with front ends the first contacting sections of said two first grounding contacts.

11. The card connector as claimed in claim 9, wherein the first grounding contact defines unitarily a first engagement tab, and the second grounding defines unitarily a second engagement tab under condition that said first engagement tab and said second engagement tab are engaged with each other in either the front-to-back direction or the transverse direction.

12. The card connector as claimed in claim 9, wherein said first grounding contact does not have the corresponding first tail section but sharing the corresponding second tail section with the second grounding contact.

13. The card connector as claimed in claim 9, wherein one of said first grounding contact and said second grounding contact further mechanically and electrically connects to a grounding bar which is secured to the housing.

14. The card connector as claimed in claim 13, further comprising a plurality of third contacts having a third grounding contact electrically and mechanically connecting to the grounding bar.

15. The card connector as claimed in claim 10, wherein said first contacts further includes two other first grounding contacts respectively located by two outer sides of said two first grounding contacts, and another grounding bus is unitarily formed with front ends of the first contacting sections of said other two first grounding contacts.

16. The card connector as claimed in claim 3, wherein said grounding bus is essentially spaced from front ends of the first contacting sections of the two first grounding contacts in a vertical direction perpendicular to both said transverse direction and said front-to-back direction but is mechanically and electrically connected to the front ends of the contacting sections of said two first grounding contacts when said two first grounding contacts are depressed toward said grounding bus by a corresponding card which is inserted into the card receiving space.

17. The card connector as claimed in claim 16, wherein said grounding bus is secured to the housing with relative movement therebetween.

18. The card connector as claimed in claim 15, wherein said another grounding bus is located in front of said grounding bus in said front-to-back direction.

* * * * *